United States Patent
Yamane

(10) Patent No.: US 10,271,159 B2
(45) Date of Patent: Apr. 23, 2019

(54) INFORMATION PROCESSING APPARATUS, INFORMATION PROCESSING SYSTEM, STORAGE MEDIUM HAVING STORED THEREIN INFORMATION PROCESSING PROGRAM, AND INFORMATION PROCESSING METHOD

(71) Applicant: NINTENDO CO., LTD., Kyoto (JP)

(72) Inventor: Tomoyoshi Yamane, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 14/620,592

(22) Filed: Feb. 12, 2015

(65) Prior Publication Data

US 2015/0271633 A1   Sep. 24, 2015

(30) Foreign Application Priority Data

Mar. 20, 2014 (JP) .................................. 2014-058146

(51) Int. Cl.
*H04W 4/02* (2018.01)
*H04W 48/04* (2009.01)
*H04W 88/08* (2009.01)

(52) U.S. Cl.
CPC ............. *H04W 4/02* (2013.01); *H04W 48/04* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 7,762,891 B2* | 7/2010 | Miyamoto | A63F 13/10 463/23 |
| 2007/0168860 A1* | 7/2007 | Takayama | H04W 12/08 715/700 |
| 2007/0280186 A1 | 12/2007 | Kaneko | |
| 2008/0200251 A1* | 8/2008 | Alderucci | G07F 17/32 463/42 |
| 2011/0307892 A1 | 12/2011 | Yamazaki et al. | |
| 2014/0364194 A1* | 12/2014 | Kusano | A63F 13/35 463/22 |

FOREIGN PATENT DOCUMENTS

JP   2007-323282 A   12/2007
JP   2011-258154     12/2011

OTHER PUBLICATIONS

Notice of Reasons for Refusal dated Oct. 2, 2018, issued in corresponding Japanese Patent Application No. 2014-058146.

* cited by examiner

*Primary Examiner* — Kee M Tung
*Assistant Examiner* — Yanna Wu
(74) *Attorney, Agent, or Firm* — Nixon & Vanderhye P.C.

(57) ABSTRACT

It is determined whether or not an information processing apparatus is located at a particular place. If it is determined in the determination of the location that the information processing apparatus is located at the particular place, use of predetermined data is permitted. If the information processing apparatus satisfies a predetermined condition related to the fact that the information processing apparatus is located at the particular place, the permitted use of the data is prohibited.

29 Claims, 8 Drawing Sheets

F I G. 1
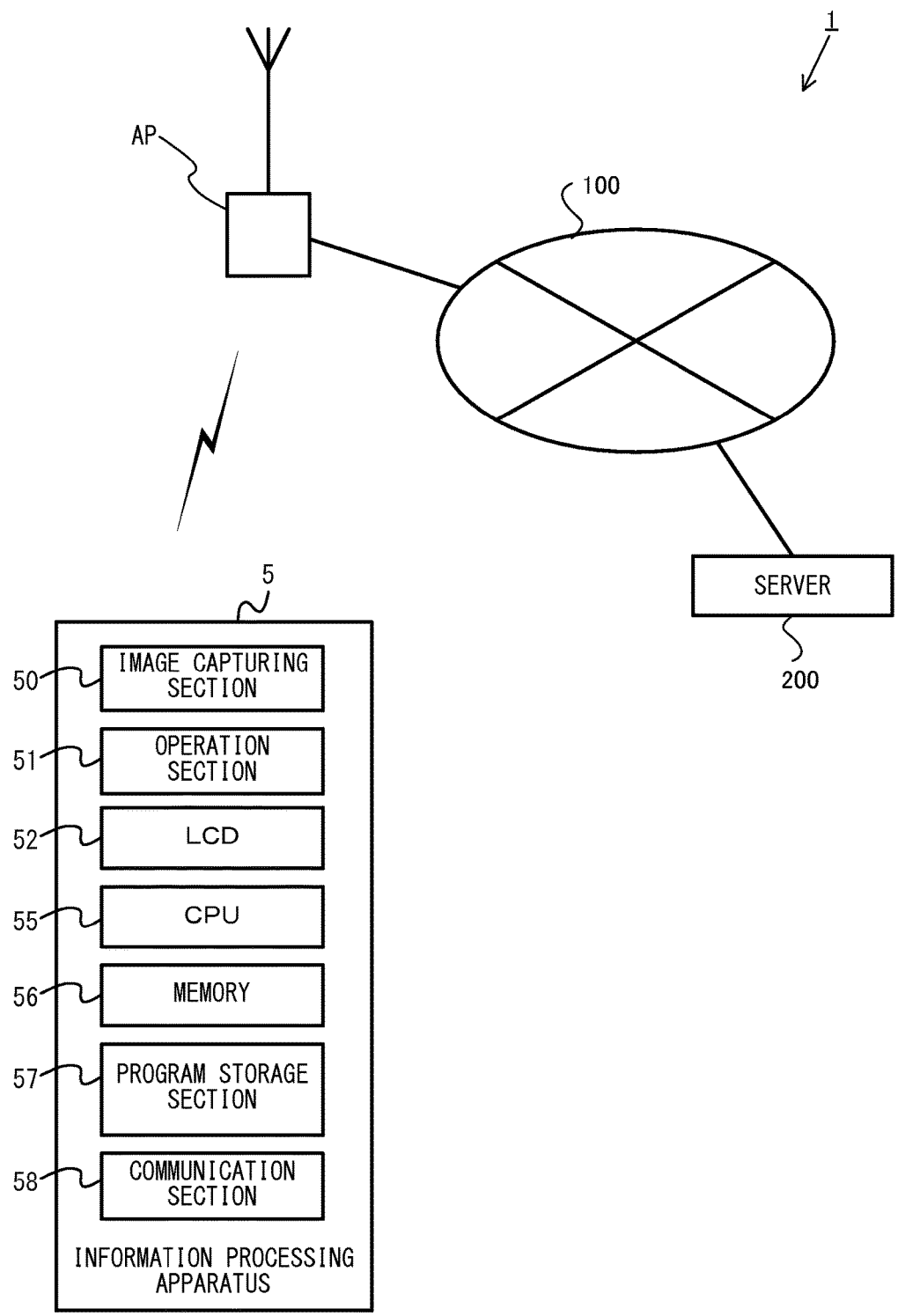

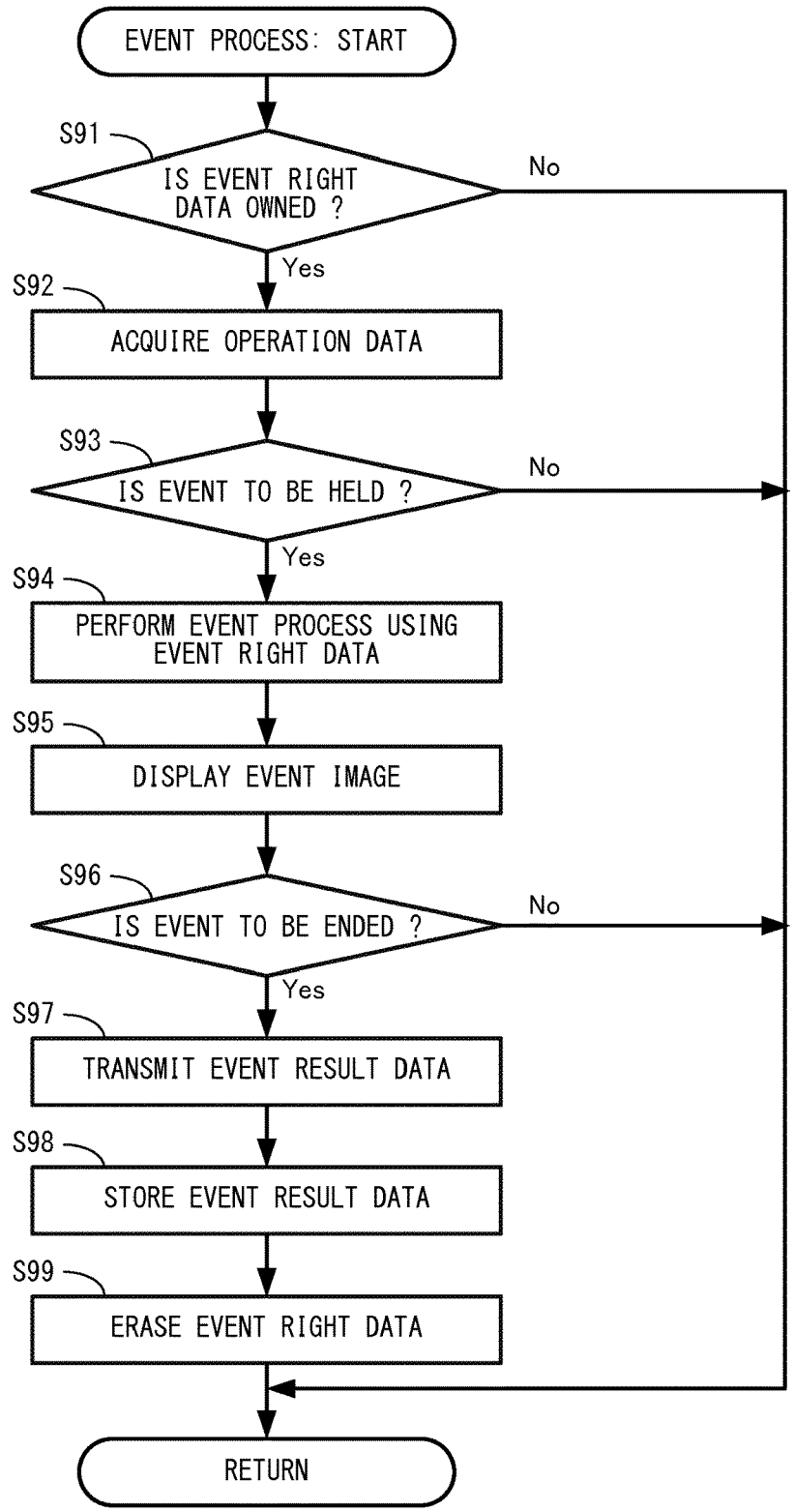

ined in the determination of the location that the information processing apparatus is located at a particular place, permit use of predetermined data; and if the information processing apparatus satisfies a predetermined condition related to the fact that the information processing apparatus is located at the particular place, prohibit the permitted use of the data.

INFORMATION PROCESSING APPARATUS, INFORMATION PROCESSING SYSTEM, STORAGE MEDIUM HAVING STORED THEREIN INFORMATION PROCESSING PROGRAM, AND INFORMATION PROCESSING METHOD

CROSS REFERENCE TO RELATED APPLICATION

The disclosure of Japanese Patent Application No. 2014-058146, filed on Mar. 20, 2014, is incorporated herein by reference.

FIELD

The technology shown here relates to an information processing apparatus, an information processing system, a storage medium having stored therein an information processing program, and an information processing method, and in particular, relates to an information processing apparatus, an information processing system, and an information processing method that are, for example, capable of communicating with another apparatus, and a storage medium having stored therein an information processing program, for example, capable of communicating with another apparatus.

BACKGROUND AND SUMMARY

Conventionally, there is a handheld information system for controlling a transmission and reception process in accordance with an access point to which the handheld information system is connected.

The handheld information system, however, merely performs processing corresponding to the access point. Thus, there is room for improvement in the enhancement of the interest of a user who uses an access point to which the handheld information system is connected.

Therefore, it is an object of an exemplary embodiment to provide an information processing apparatus, an information processing system, and an information processing method that are capable of enhancing the interest of a user about a particular place, and an storage medium having stored therein an information processing program capable of enhancing the interest of a user about a particular place.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of an information processing apparatus according to an exemplary embodiment, an information processing apparatus is capable of communicating with another apparatus. The information processing apparatus includes one or more processors. The one or more processors are configured to: determine whether or not the information processing apparatus is located at a particular place; if it is determined in the determination of the location that the information processing apparatus is located at the particular place, permit use of predetermined data; and if the information processing apparatus satisfies a predetermined condition related to the fact that the information processing apparatus is located at the particular place, prohibit the permitted use of the data.

Based on the above, it is possible to set data that can be used when an information processing apparatus is located at a particular place. This makes it possible to enhance the interest of a user about the particular place. Further, it is possible to motivate the user to visit the particular place.

In addition, if it is determined in the determination of the location that the information processing apparatus is not located at the particular place, the use of the data may be prohibited in the prohibition.

Based on the above, it is possible to set data that can be used only when the information processing apparatus is located at the particular place. This makes it possible to further enhance the interest of the user.

In addition, the one or more processors may be further configured to determine whether or not a predetermined time has elapsed since it has been determined in the determination of the location that the information processing apparatus has been located at the particular place. In this case, if it is determined in the determination of the predetermined time that the predetermined time has elapsed, the use of the data may be prohibited in the prohibition.

Based on the above, it is possible to set data that can be used only within a predetermined time since the information processing apparatus has been located at the particular place. This makes it possible to further enhance the interest of the user.

In addition, the one or more processors may be further configured to determine whether or not a predetermined time has elapsed since it has been determined in the determination of the location that the information processing apparatus has not been located at the particular place after it had been determined that the information processing apparatus had been located at the particular place. In this case, if it is determined in the determination of the predetermined time that the predetermined time has elapsed, the use of the data may be prohibited in the prohibition.

Based on the above, it is possible to set data that can be used only within a predetermined time since the information processing apparatus has moved away from the particular place. This makes it possible to further enhance the interest of the user.

In addition, the information processing apparatus may further include a data storage unit configured to store data. The predetermined data may be stored in the data storage unit. After it has been determined in the determination of the location that the information processing apparatus has been located at the particular place, the use of the predetermined data stored in advance in the data storage unit may be permitted in the permission.

Based on the above, if the information processing apparatus has been located at the particular place, it is possible to use data stored in advance. This makes it possible to enhance the interest of the user.

In addition, the one or more processors may be further configured to receive data transmitted from another apparatus and store the received data in the data storage unit. After it has been determined in the determination of the location that the information processing apparatus has been located at the particular place, the use of the predetermined data received at a place different from the particular place and stored in the data storage unit in the reception of the data may be permitted in the permission.

Based on the above, if the information processing apparatus has been located at the particular place, it is possible to use data received at a different place. This makes it possible to enhance the interest of the user.

In addition, the information processing apparatus may further include a data storage unit configured to store data. The one or more processors may be further configured to receive data transmitted from another apparatus and store the received data in the data storage unit. If it is determined in the determination of the location that the information processing apparatus is located at the particular place, the use of the predetermined data received at the particular place and stored in the data storage unit in the reception of the data may be permitted in the permission.

Based on the above, it is possible to use, at the particular place, data received at the particular place from another apparatus. This makes it possible to enhance the interest of the user.

In addition, the one or more processors may be further configured to determine whether or not another information processing apparatus is located at the particular place. Use of different data may be permitted in the permission in accordance with whether or not it is determined in the determination of presence or absence of another apparatus that another information processing apparatus is located at the particular place.

Based on the above, it is possible to use data different in accordance with the number of apparatuses located at the particular place.

In addition, if the information processing apparatus can communicate data via a particular access point installed at the particular place, it may be determined in the determination of the location that the information processing apparatus is located at the particular place.

Based on the above, whereby it is possible, only by specifying an access point, to set as the particular place the range where the information processing apparatus can communicate with the access point.

In another exemplary configuration of the information processing apparatus according to the exemplary embodiment, an information processing apparatus is capable of communicating with another apparatus. The information processing apparatus includes one or more processors. The one or more processors are configured to: determine whether or not the information processing apparatus is located at a particular place; if it is determined in the determination of the location that the information processing apparatus is located at the particular place, change a parameter used when predetermined processing is performed; and if the information processing apparatus satisfies a predetermined condition related to the fact that the information processing apparatus is located at the particular place, change back the changed parameter to an original state.

Based on the above, if an information processing apparatus has been located at a particular place, it is possible to change a predetermined parameter. This makes it possible to enhance the interest of a user.

In addition, the exemplary embodiment may be carried out in the forms of an information processing system, a storage medium having stored therein an information processing program, and an information processing method.

According to the exemplary embodiment, it is possible to enhance the interest of a user. For example, data that can be used at a particular place or a parameter that is changed at the particular place is set, whereby it is possible to enhance the interest of the user about the particular place. This makes it possible to motivate the user to visit the particular place.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 1 is a block diagram showing a non-limiting example of an information processing system 1, which includes an information processing apparatus 5;

FIG. 8 is a subroutine flow chart showing a non-limiting example of the detailed processing of an event process in step 88 in FIG. 7.

DETAILED DESCRIPTION OF NON-LIMITING EXAMPLE EMBODIMENTS

Figure 2:
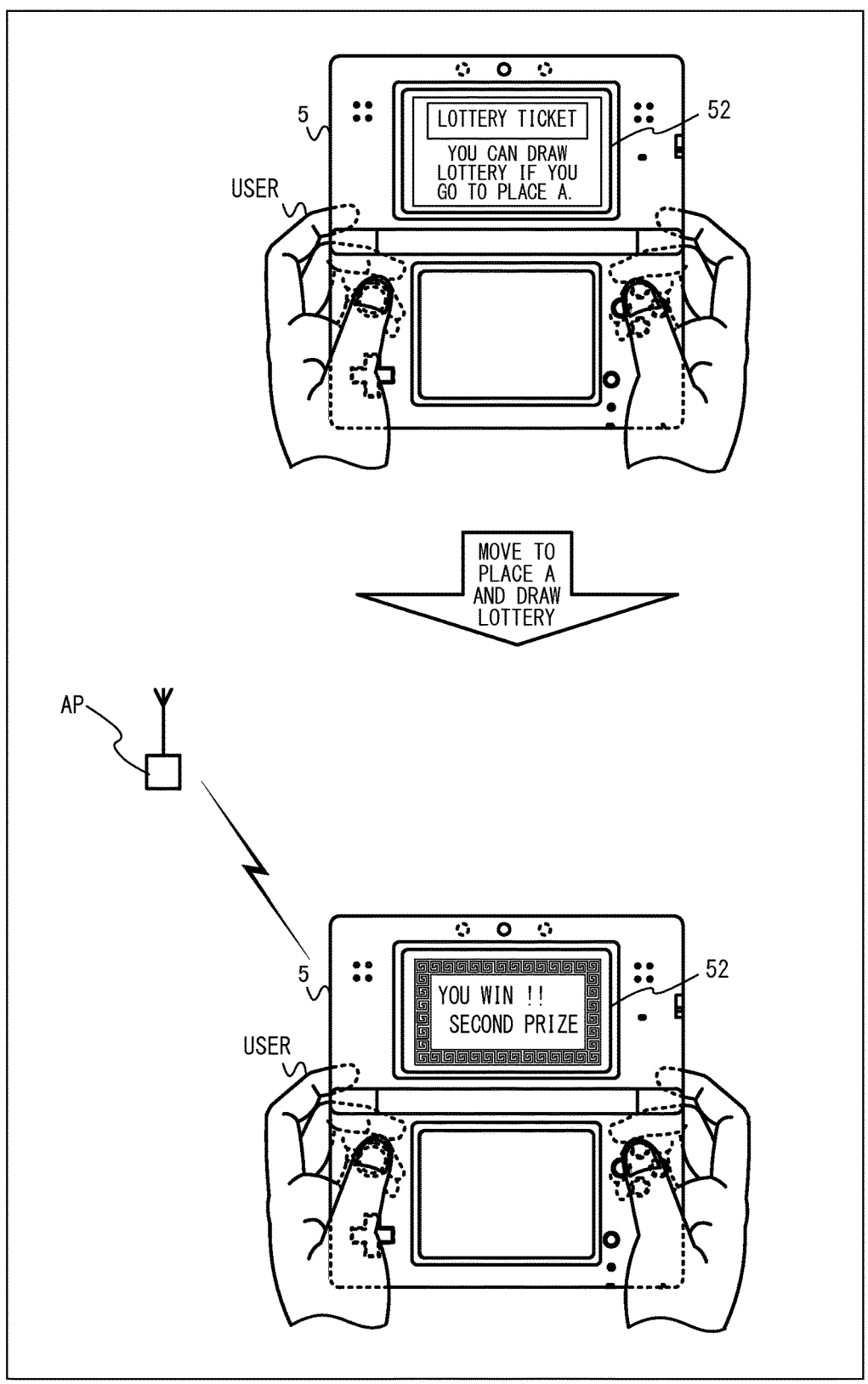
FIG. 2 is a diagram showing a non-limiting example of a first event held in the information processing system 1.

With reference to FIG. 1, a description is given of an information processing system including an information processing apparatus for executing an information processing program according to an exemplary embodiment. It should be noted that FIG. 1 is a block diagram showing an example of an information processing system 1, which includes an information processing apparatus 5. As shown in FIG. 1, the information processing system 1 is constructed by the connection between the information processing apparatus 5 and a server 200 via an access point AP and a network 100, the information processing apparatus 5 and the server 200 placed remotely from each other.

The information processing apparatus 5 is configured to connect to the network 100 via the access point AP using wireless communication. The information processing apparatus 5 can communicate with the server 200 by establishing a connection with the server 200 via the network 100. For example, the information processing apparatus 5 can execute a program stored in a storage medium such as an exchangeable memory card or an exchangeable optical disk, or received from the server 200 or another apparatus. The information processing apparatus 5 may be a handheld game apparatus, or may be a device such as a general personal computer, a mobile phone, or a PDA (Personal Digital Assistant).

The information processing apparatus 5 includes an image capturing section 50, an operation section 51, an LCD 52, a CPU 55, a memory 56, a program storage section 57, a communication section 58, and the like. It should be noted that the information processing apparatus 5 may be composed of one or more apparatuses including: an information processing apparatus having at least the CPU 55; and another apparatus.

The CPU 55 is an example of information processing means (a computer) for executing various types of information processing. The CPU 55 has the function of, as the various types of information processing, receiving data transmitted from the server 200 via the communication section 58, and executing processing based on the data, and the like. Further, the CPU 55 has the function of, as the various types of information processing, executing the process of creating transmission data to be transmitted to the server 200, and transmitting the transmission data via the communication section 58, and the like. Further, the CPU 55 also has the function of transmitting and receiving data to and from another apparatus (e.g., another information processing apparatus 5) via the communication section 58 by direct communication (e.g., near field communication), or by wireless communication via a predetermined access point, with the other apparatus, and the function of transmitting and receiving data to and from another apparatus by communicating with the other apparatus via the network 100 or another network. For example, the above functions are achieved by the CPU 55 executing a predetermined program. In the exemplary embodiment, the information processing apparatus 5 can communicate with the server 200 only via a particular access point AP. If the information processing apparatus 5 has become able to communicate with the particular access point AP using the communication section 58, the information processing apparatus 5 performs information processing by communicating with the server 200. It should be noted that there may be a plurality of particular access points AP capable of communicating with the server 200.

In addition, the CPU 55 has the function of, as the various types of information processing, performing processing based on a captured image captured by the image capturing section 50 and an operation of a user performed on the operation section 51, and the like. For example, if a predetermined marker image is included in a captured image captured by the image capturing section 50, the CPU 55 may perform a display control process for combining a virtual object with the captured image at a placement position based on the display position of the marker image, and displaying the combined image on the LCD 52.

The memory 56 stores various types of data for use when the CPU 55 performs the above processing. The memory 56 is, for example, a memory accessible by the CPU 55.

The program storage section 57 stores a program. The program storage section 57 may be any storage device (storage medium) accessible by the CPU 55. For example, the program storage section 57 may be a storage device provided in the information terminal apparatus 5 having the CPU 55, or may be a storage medium detachably attached to the information terminal apparatus 5 having the CPU 55. Alternatively, the program storage section 57 may be a storage device (a server or the like) connected to the CPU 55 via a network. The CPU 55 may load a part or all of the program into the memory 56 at appropriate timing and execute the loaded program.

The operation section 51 is an input apparatus that can be operated by the user. The operation section 51 may be any input apparatus. For example, the operation section 51 may be an input apparatus such as an operation button, a stick, or a touch panel, or may include an orientation sensor such as a gyro sensor or an acceleration sensor.

The LCD 52 is an example of a display section included in the information terminal apparatus 5 and displays an image in accordance with an instruction from the CPU 55. It should be noted that the LCD 52 may be a display apparatus capable of displaying a stereoscopically visible image by displaying a left-eye image and a right-eye image using substantially the same display area.

For example, the image capturing section 50 includes a camera fixedly provided on the outer surface of a housing of the information processing apparatus 5 such that the image capturing direction of the camera is the depth direction of a screen of the LCD 52. The camera is connected to the CPU 55, captures an image in accordance with an instruction from the CPU 55, and outputs the captured image data to the CPU 55. The camera includes an imaging device (e.g., a CCD image sensor, a CMOS image sensor, or the like) having a predetermined resolution, and a lens. It should be noted that the lens may have a zoom mechanism. Further, the camera may form a stereo camera including two image capturing sections fixedly provided such that the image capturing directions of the image capturing sections are parallel in the left-right direction.

The server 200 transmits and receives communication packets, thereby communicating with the information processing apparatus 5 via a particular access point AP and the network 100. For example, the server 200 manages various events held in the information processing apparatus 5 capable of communicating with the particular access point AP. Then, the server 200 performs the process of transmitting data (e.g., event setting data) corresponding to a reception request from the information processing apparatus 5, the process of receiving data (e.g., event result data) transmitted from the information processing apparatus 5 and storing the data in a storage section. It should be noted that the server 200 may be formed of a single server machine, or may be formed of a plurality of server machines.

Figure 3:
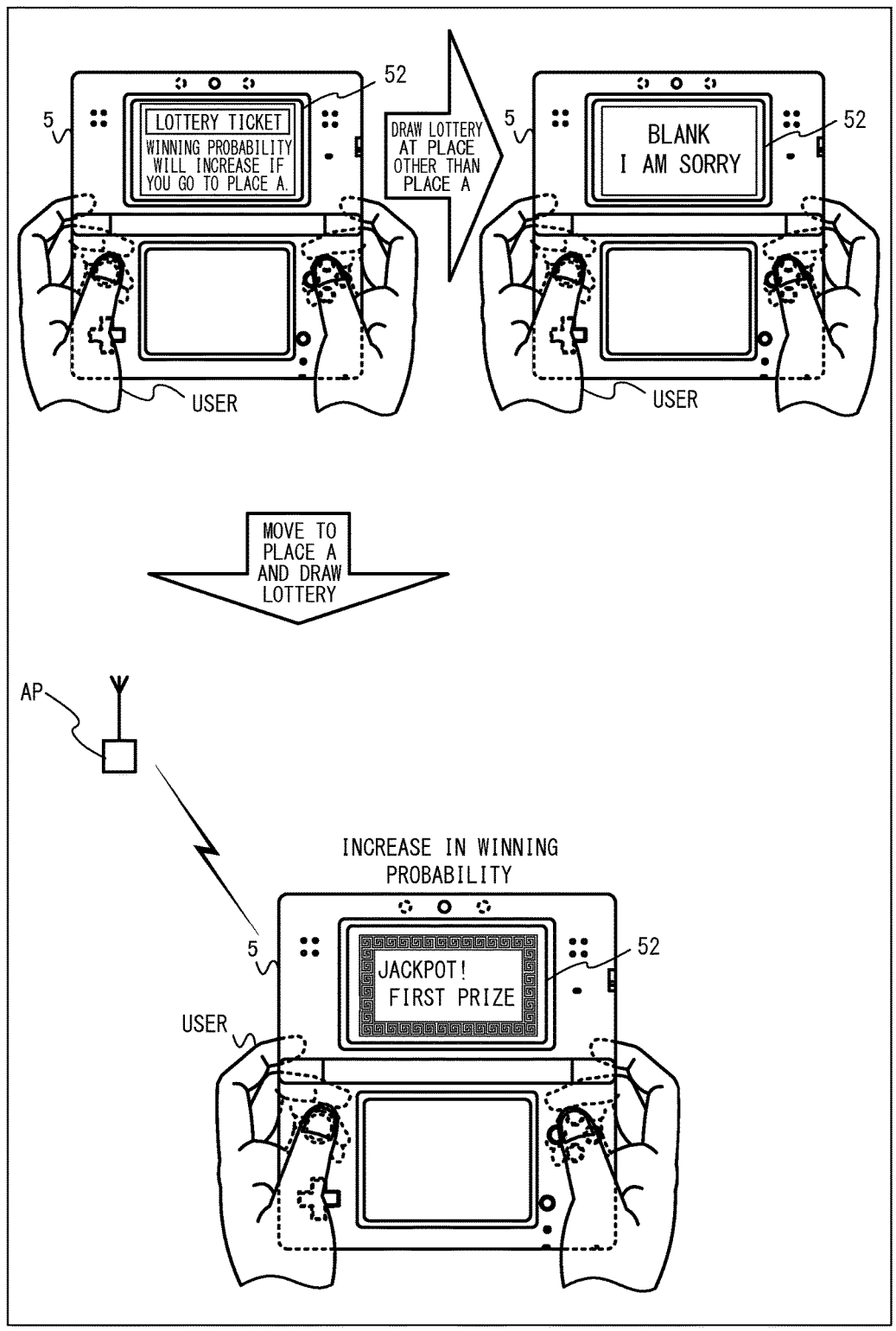
FIG. 3 is a diagram showing a non-limiting example of a second event held in the information processing system 1.
Figure 4:
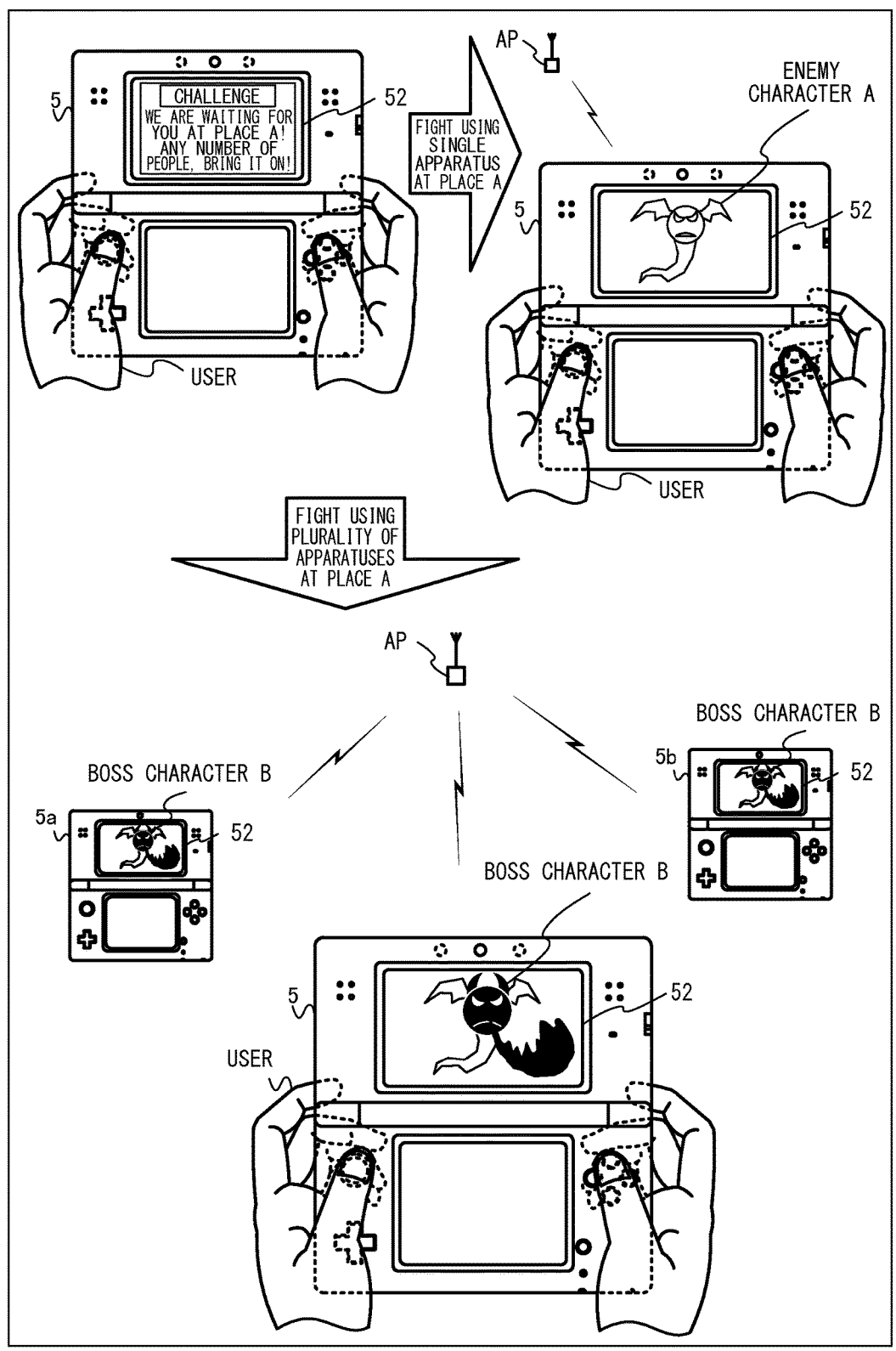
FIG. 4 is a diagram showing a non-limiting example of a third event held in the information processing system 1.
Figure 5:
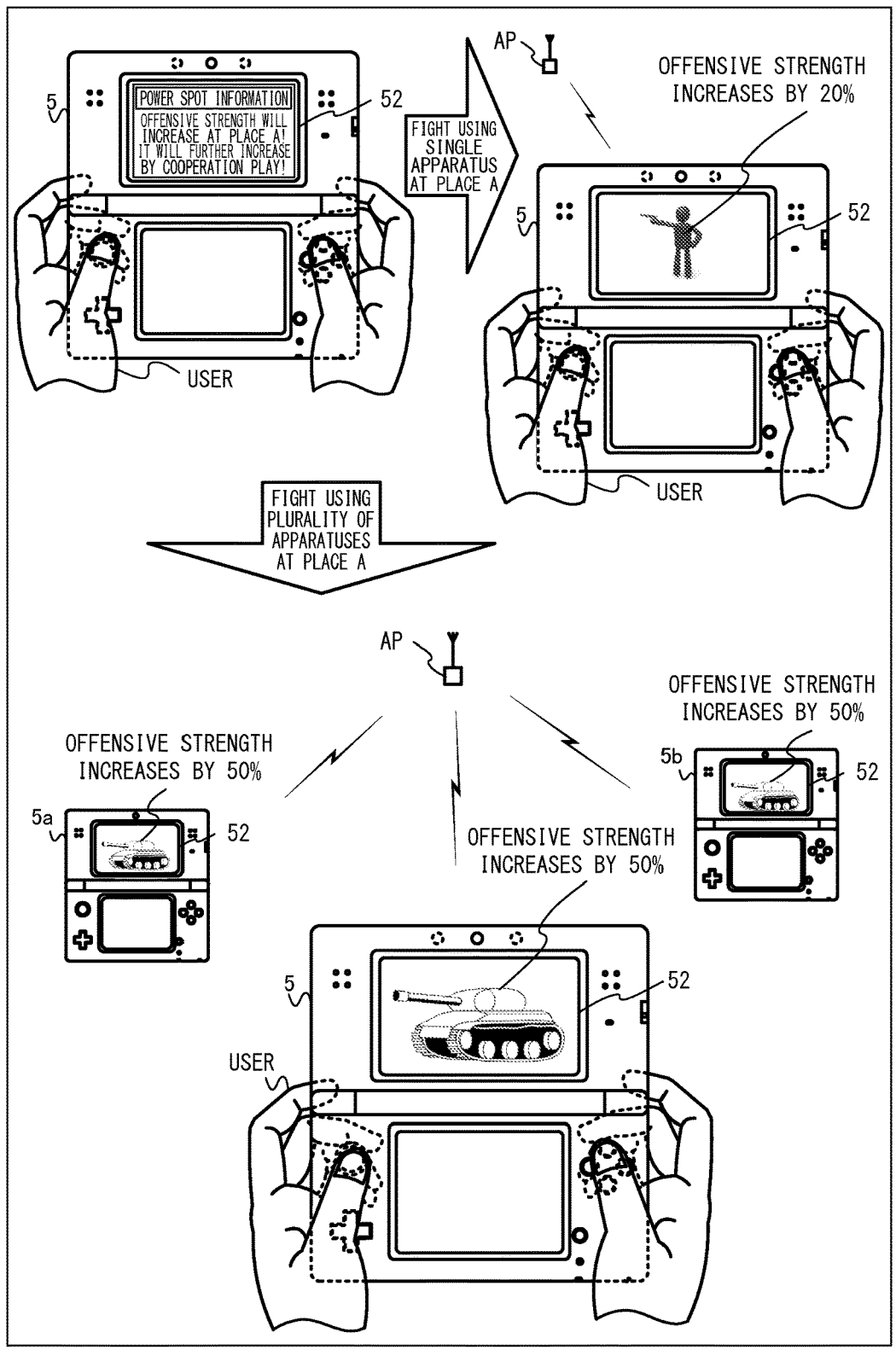
FIG. 5 is a diagram showing a non-limiting example of a fourth event held in the information processing system 1.

Next, with reference to FIGS. 2 to 5, a description is given of an example of an overview of the processing performed in the information processing system 1, before the description of specific processing performed by the information processing apparatus 5. FIG. 2 is a diagram showing an example of a first event held in the information processing system 1. FIG. 3 is a diagram showing an example of a second event held in the information processing system 1. FIG. 4 is a diagram showing an example of a third event held in the information processing system 1. FIG. 5 is a diagram showing an example of a fourth event held in the information processing system 1.

In FIG. 2, in the first event, the information processing apparatus 5 acquires in advance a lottery ticket indicating the right to participate in the first event via a particular access point AP. The information processing apparatus 5 can own the lottery ticket when event right data is stored in the information processing apparatus 5. As an example, the event right data is stored in the information processing apparatus 5 as follows. The information processing apparatus 5 receives the event right data in advance from another apparatus via the communication section 58 by direct communication (e.g., near field communication), or by wireless communication via a predetermined access point, with the other apparatus, or receives the event right data in advance by communicating with another apparatus via the network 100 or another network. As another example, the event right data is stored in the memory 56 as follows. The event right data is stored in advance in the memory 56 or acquired in advance from a storage medium attachable to and detachable from the information processing apparatus 5. Then, the content of the lottery ticket (the content of the event) is displayed on the LCD 52 by being triggered by the acquisition of the event right data or in accordance with a user operation. For example, in the example of FIG. 2, on the LCD 52, a lottery ticket is displayed that allows the user to draw a lottery if the user goes to a particular place (a place A).

At the place A in the real world, where the first event is held, the particular access point AP is installed. Here, the access point AP has a communication range where the access point AP can communicate wirelessly with the information processing apparatus 5. If the information processing apparatus 5 has entered the communication range of the access point AP, the process of establishing the connection between the information processing apparatus 5 and the access point AP by wireless communication is performed automatically or in accordance with a user operation. Then, transmission data (data representing the type of the information processing apparatus 5 itself and the type of the event right data owned by the information processing apparatus 5, and the like) set in the information processing apparatus 5 connected to the particular access point AP is transmitted to the server 200 via the network 100. On the other hand, if having received transmission data from the information processing apparatus 5, the server 200 transmits event setting data corresponding to the transmission data to the transmission source of the transmission data.

If the information processing apparatus 5 owning the event right data, which gives the right to participate in the first event, has established a connection with the particular access point AP by wireless communication, the first event is held in the information processing apparatus 5. In the example of FIG. 2, on the LCD 52, an image is displayed that shows that a lottery is held in accordance with the fact that the information processing apparatus 5 owning a lottery ticket for the first event has established a connection with the access point AP by wireless communication, and a second prize is won in the lottery.

If the first event has ended (the lottery has ended) at the place A, event result data indicating the result of the first event is stored in the memory 56 of the information processing apparatus 5, and the event right data, which gives the right to participate in the first event, is deleted from the memory 56. The event result data acquired in advance can thus be used at the place A (specifically, in the range where the information processing apparatus 5 can communicate with the particular access point AP), and cannot be used at a place other than the place A. Further, also the event result data generated using the event right data may be able to be used only at the place A, so that if the information processing apparatus 5 has moved away from the place A after the acquisition of the event result data, the event result data may be deleted from the memory 56. In this case, the result of the first event (the result of the lottery) can be displayed and viewed on the LCD 52 only at the place A. As described above, an access point that allows the holding of the event where the event right data and the event result data can be used is narrowed down to the particular access point AP. This effectively motivates a user to visit a particular place (the place A, which is the installation location of the particular access point AP).

In FIG. 3, in the second event, the information processing apparatus 5 acquires in advance a lottery ticket indicating the right to participate in the second event via a particular access point AP. The information processing apparatus 5 can also own the lottery ticket when event right data is stored in the information processing apparatus 5. The content of the lottery ticket (the content of the event) is also displayed on the LCD 52 by being triggered by the acquisition of the event right data or in accordance with a user operation. For example, in the example of FIG. 3, on the LCD 52, a lottery ticket is displayed that indicates that the probability of winning the lottery will be increased if the user goes to a particular place (a place A). It should be noted that the method of acquiring the event right data is similar to that of the above first event, and therefore is not described in detail here.

The second event can be held in the information processing apparatus 5 even if the user does not go to the particular place (the place A). For example, if the information processing apparatus 5 owning the event right data, which gives the right to participate in the second event, has held the second event at a place other than the place A, the second event is held in the state where a parameter used when the second event (e.g., a lottery) is held (e.g., the probability of winning the lottery) is set to a first value. In the example of FIG. 3, on the LCD 52, an image is displayed that shows that if the information processing apparatus 5 holds a lottery, which is an example of the second event, at a place other than the place A, the lottery is lost.

If, on the other hand, the information processing apparatus 5 owning the event right data, which gives the right to participate in the second event, has established by wireless communication a connection with the particular access point AP installed at the place A, the second event is held in the state where a parameter used when the second event (e.g., a lottery) is held (e.g., the probability of winning the lottery) is changed from the first value to a second value (e.g., the state where the lottery will be won with a relatively high probability). In the example of FIG. 3, on the LCD 52, an image is displayed that shows that a lottery is held in the state where the information processing apparatus 5 owning a lottery ticket for the second event has established a connection with the access point AP by wireless communication, and a first prize is won in the lottery. It should be noted that if the information processing apparatus 5 has moved away from the place A (if the wireless communication with the particular access point AP has entered an unconnected state), the above parameter is restored from the second value to the first value and changed back to the original.

As described above, if the information processing apparatus 5 has entered the place A (specifically, the range where the information processing apparatus 5 can communicate with the particular access point AP), the second event is held in the state where a predetermined parameter used when the second event is held has been changed from the first value to the second value. If, on the other hand, the information processing apparatus 5 is located at a place other than the place A, the second event is held with the parameter set to the first value. An access point where a parameter used when predetermined processing is performed is changed is narrowed down to the particular access point AP. This effectively motivates a user to visit a particular place (the place A, which is the installation location of the particular access point AP).

It should be noted that in the above first and second events, an example has been used where, if the information processing apparatus 5 owns the event right data, which gives the right to participate in the first event or the second event, a lottery ticket is displayed on the LCD 52 to notify the user of the right. Alternatively, the user may be notified of the right in another form. For example, a point to be given to the user every time the user plays a game in the information processing apparatus 5 may be set. If a predetermined number of these points have been accumulated, then on the LCD 52, a message may be displayed that indicates that the user has the right to participate in the first event or the second event.

In FIG. 4, in the third event, the information processing apparatus 5 acquires in advance a written challenge notifying the user of the holding of the third event, which will be held using a particular access point AP. The information processing apparatus 5 can own the written challenge when event holding data is stored in the information processing apparatus 5. The content of the written challenge (the content of the event) is displayed on the LCD 52 by being triggered by the acquisition of the event holding data or in accordance with a user operation. For example, in the example of FIG. 4, on the LCD 52, a written challenge is displayed that indicates that if the user goes to a particular place (a place A), the user can play a versus game where some people cooperate. It should be noted that the method of acquiring the event holding data is similar to that of the above event right data, and therefore is not described in detail here.

In the third event, when a versus game where one or more people defeat an enemy character is performed in the information processing apparatus 5 at the particular place (the place A), it is possible to fight against a special character. For example, if the information processing apparatus 5 owning the event holding data, which notifies the user of the holding of the third event, has established a connection with the particular access point AP by wireless communication, it is possible to perform in the information processing apparatus 5 a versus game where the user fights against a special character, as the third event. For example, if the third event is held in the state where a single information processing apparatus 5 has established a connection with the particular access point AP by wireless communication, it is possible to play a game where an enemy character A is displayed on the LCD 52 so that the user fights against the enemy character A. It should be noted that data for causing the enemy character A to appear in the versus game is stored in advance in the information processing apparatus 5. The data, however, cannot be used at a place other than the place A, and therefore, the enemy character A is a rare character that only appears at the particular place.

If, on the other hand, the same third event is held in the state where a plurality of information processing apparatuses 5 have established connections with the particular access point AP by wireless communication, it is possible to play in each information processing apparatus 5 a game where a boss character B is displayed on the LCD 52 so that the user fights against the boss character B. At this time, each information processing apparatus 5 may perform a single versus game in synchronization by direct communication or by communication via the access point AP. In this case, a game where player characters operated by the respective information processing apparatuses 5 cooperate to fight against the boss character B may be performed as the third event. It should be noted that data for causing the boss character B to appear in the versus game is also stored in advance in each information processing apparatus 5. The data, however, cannot be used unless the game is performed at the place A using a plurality of information processing apparatuses 5. Thus, the boss character B is a rarer character that only appears at the particular place.

As described above, the data stored in advance for causing the enemy character A or the boss character B to appear in the versus game can be used at the place A (specifically, the range where the information processing apparatus 5 can communicate with the particular access point AP), but cannot be used at a place other than the place A. As described above, an access point that allows the holding of the event where the data for causing the enemy character A or the boss character B to appear in the versus game can be used is narrowed down to the particular access point AP. This effectively motivates a user to visit a particular place (the place A, which is the installation location of the particular access point AP). Further, the condition for the appearance of the boss character B is not only a connection by wireless communication with the particular access point AP but also the fact that another information processing apparatus 5 is connected to the particular access point AP by wireless communication. This makes it possible to use data different depending on the number of information processing apparatuses 5 located at the particular place. As described above, the fact that a plurality of information processing apparatuses 5 are located at the particular place is defined as an additional condition. This effectively motivates a plurality of users to visit the particular place.

It should be noted that in the above third event, as data that can be used when a predetermined game is performed, data for causing the appearance of an opponent (an enemy character) against which the user fights in a versus game has been used as an example. Alternatively, another type of data may be able to be used. For example, if a versus game has been performed at a particular place, data for allowing the use of data for causing the appearance of a character (a so-called helpful character) that cooperates with a player character to fight in the versus game so that it is possible to advantageously advance the versus game may be able to be used.

In FIG. 5, in the fourth event, the information processing apparatus 5 acquires in advance power spot information notifying the user of the holding of the fourth event, which will be held using a particular access point AP. The information processing apparatus 5 can own the power spot information when event holding data is stored in the information processing apparatus 5. The content of the power spot information (the content of the event) is displayed on the LCD 52 by being triggered by the acquisition of the event holding data or in accordance with a user operation. For example, in the example of FIG. 5, on the LCD 52, power spot information is displayed that indicates that if the user goes to a particular place (a place A), an offensive strength in a predetermined game will be increased, and if some people cooperate to perform the game, the offensive strength will be further increased. It should be noted that the method of acquiring the event holding data is similar to that of the above event right data, and therefore is not described in detail here.

In the fourth event, when a versus game played by one or more people at the particular place (the place A) is performed in the information processing apparatus 5, it is possible to change a predetermined parameter (the offensive strength of a player character operated using the information processing apparatus 5). For example, if the information processing apparatus 5 owning the event holding data, which notifies the user of the holding of the fourth event, has established a connection with the particular access point AP by wireless communication, it is possible to perform in the information processing apparatus 5 a versus game using a player character of which the offensive strength has been increased, as the fourth event. For example, if the fourth event is held in the state where a single information processing apparatus 5 has established a connection with the particular access point AP by wireless communication, it is possible to perform a versus game using a player character of which the offensive strength has increased by 20% from the case where the versus game is performed at a place other than the place A.

If, on the other hand, the same fourth event is held in the state where a plurality of information processing apparatuses 5 have established connections with the particular access point AP by wireless communication, it is possible to perform in each information processing apparatus 5 a versus game using a player character of which the offensive strength has increased by 50% from the case where the versus game is performed at a place other than the place A. At this time, each information processing apparatus 5 may perform a single versus game in synchronization by direct communication or by communication via the access point AP. In this case, a game where, in the state where the offensive strength of the player character operated by each information processing apparatus 5 has increased by 50%, the player characters cooperate to fight against an enemy character may be performed as the fourth event. Further, a predetermined parameter used when a predetermined game is performed may be changed so that the larger the number of information processing apparatuses 5 connected to the particular access point AP, the greater the effect to be obtained in the fourth event.

It should be noted that the above versus game can be performed in the information processing apparatus 5 even if the user does not go to the particular place (the place A). For example, if the information processing apparatus 5 owning the event holding data, which notifies the user of the holding of the fourth event, has performed the versus game at a place other than the place A, the versus game is performed in the state where a predetermined parameter used when the versus game is performed (e.g., the offensive strength of the player character) is set to a value smaller than a value set at the place A. It should be noted that if the information processing apparatus 5 has moved away from the place A (if the wireless communication with the particular access point AP has entered an unconnected state), the above parameter is restored from the greater value, in which the offensive strength has been increased, to the smaller value and changed back to the original.

As described above, if the information processing apparatus 5 has entered the place A (specifically, the range where the information processing apparatus 5 can communicate with the particular access point AP), then in the fourth event, a predetermined game is performed in the state where a predetermined parameter used when the predetermined game is performed has been changed. If, on the other hand, the information processing apparatus 5 is located at a place other than the place A, the above game is performed without a change in the parameter. As described above, an access point where a parameter used when predetermined processing is performed is changed is narrowed down to the particular access point AP. This effectively motivates a user to visit a particular place (the place A, which is the installation location of the particular access point AP). Further, in the fourth event, if not only the information processing apparatus 5 is connected to the particular access point AP by wireless communication, but also another information processing apparatus 5 is connected to the particular access point AP by wireless communication, the above parameter is further changed (e.g., the offensive strength is further increased), and is changed to the value of a parameter different depending on the number of information processing apparatuses 5 located at the particular place. As described above, the fact that a plurality of information processing apparatuses 5 are located at the particular place is defined as an additional condition. This effectively motivates a plurality of users to visit to the particular place.

It should be noted that in the fourth event described above, as a parameter to be changed when a predetermined game is performed, a parameter indicating the offensive strength of a player character has been used as an example. Alternatively, another parameter may be changed. For example, a parameter indicating the defensive strength, the resilience, or the amount of life of a player character, the appearance rate of a rare item, or the like in a predetermined game may be changed. Yet alternatively, if the third event or the fourth event is held in the state where a plurality of information processing apparatuses 5 are wirelessly connected to the access point AP, predetermined data may be enabled to be used or a predetermined parameter may be changed in at least one of the information processing apparatuses 5. In this case, even if a plurality of information processing apparatuses 5 have connected to the access point AP, the number of information processing apparatuses 5 capable of obtaining the effect of the above event is limited. This enables a user to feel that the above event is more special. Further, it is also possible to construct a game environment that gives an impression that a user who has failed in obtaining the effect of the above event is giving special power to a user who has succeeded in obtaining the effect of the event.

It should be noted that in the first to fourth events described above, only if the information processing apparatus 5 is located at the particular place (only if the information processing apparatus 5 can communicate with the particular access point AP), predetermined data is enabled to be used or a predetermined parameter is changed. Alternatively, another condition may be further added. As an example, after a predetermined time has elapsed since the information processing apparatus 5 has moved away from the particular place (since the wireless communication with the particular access point AP has changed from a connected state to an unconnected state), the use of predetermined data that has been able to be used at the particular place may be prohibited, or a predetermined parameter that has been changed at the particular place may be changed back to the original. As another example, even if the information processing apparatus 5 is located at the particular place after a predetermined time has elapsed since the information processing apparatus 5 has entered the particular place (if the wireless communication with the particular access point AP has changed from an unconnected state to a connected state), the use of predetermined data that has been able to be used may be prohibited, or a changed predetermined parameter may be changed back to the original.

In addition, in accordance with the fact that the information processing apparatus 5 has connected to the particular access point AP, predetermined data that is enabled to be used at the particular place may be transmitted from another apparatus (e.g., the server 200). In this case, data newly acquired in accordance with the fact that the information processing apparatus 5 has connected to the particular access point AP can be used only in the state where the information processing apparatus 5 is connected to the particular access point AP.

In addition, the content of the processing performed in the information processing apparatus 5 at the particular place may be determined only by the information processing apparatus 5 or may be controlled by the server 200. For example, in the second case, in the first event or the second event described above, based on the lottery situation the up to the current time managed by the server 200 (e.g., the number of wins or the winning rate up to the current time, including other information processing apparatus 5), the server 200 determines whether or not the information processing apparatus 5 is to win the lottery event at the particular place. Further, in the second case, in the above third event, based on the fight situation up to the current time managed by the server 200 (e.g., the number of fights of each enemy character against which the user has fought up to the current time, the winning percentage, the game skill level of the user who uses the event, or the like), the server 200 determines the type and the level of an enemy character against which the user is to fight.

In addition, in the third and fourth events described above, the number of information processing apparatuses 5 located at the particular place, which is a condition for enabling data to be used or changing a parameter at the particular place, may include the number of apparatuses that are not participating in the event. That is, based on the total number of information processing apparatuses 5 connected to the particular access point AP regardless of whether or not the information processing apparatuses 5 are participating in the event, data that is enabled to be used or the value of a parameter to be changed at the particular place may be determined.

In addition, in the above exemplary embodiment, a particular access point is set, thereby setting the range where the particular access point can communicate, as a particular place to which a user is to be led. Alternatively, the particular place may be set by another method. As an example, if the information processing apparatus 5 has a GPS (Global Positioning System) function, it may be determined, based on the position on earth calculated by the GPS function, whether or not the information processing apparatus 5 is accessing an access point from a particular place. As another example, if the information processing apparatus 5 has the function of detecting the radio field intensity of an access point when communicating wirelessly with the access point, it may be determined, based on an access position calculated based on the radio field intensity of each access point detected by this function and the installation position of the access point, whether or not the information processing apparatus 5 is accessing an access point from a particular place. Alternatively, using an apparatus for transmitting position information indicating the installation position of the apparatus (e.g., a device for transmitting the position information using a beacon) itself, it may be determined whether or not the information processing apparatus 5 is accessing an access point from a particular place. For example, if the information processing apparatus 5 has received position information from another apparatus, it may be determined, based on the received position information, whether or not the information processing apparatus 5 is accessing an access point from a particular place.

Figure 6:
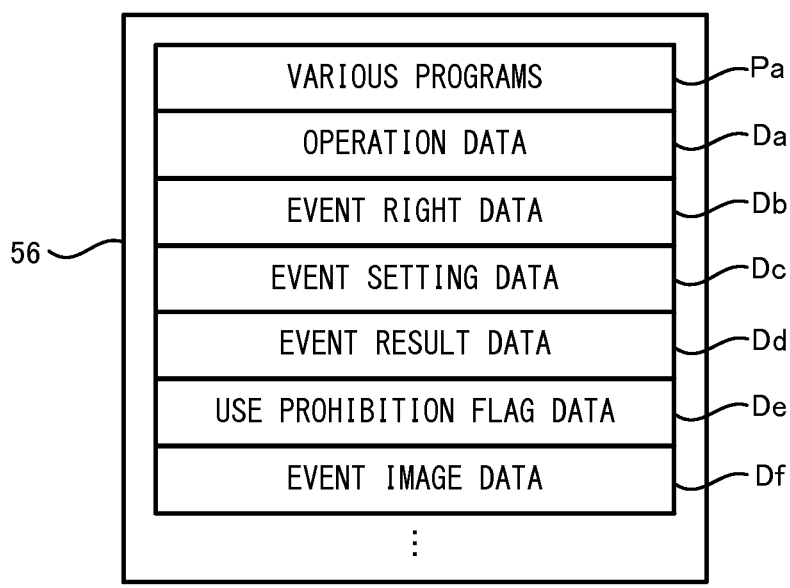
FIG. 6 is a diagram showing non-limiting examples of main data and programs stored in a memory 56 of the information processing apparatus 5.

Next, the details of the processing performed by the information processing apparatus 5 are described. First, with reference to FIG. 6, main data used in the processing is described. It should be noted that FIG. 6 is a diagram showing examples of the main data and programs stored in the memory 56 of the information processing apparatus 5. To make the description specific, the following description mainly uses an example of processing assuming the case where the above first event is held.

As shown in FIG. 6, the following are stored in the data storage area of the memory 56: operation data Da; event right data Db; event setting data Dc; event result data Dd; use prohibition flag data De; event image data Df; and the like. It should be noted that the memory 56 may store, as well as the data shown in FIG. 6, data necessary for the processing, such as data used in an application to be executed. Further, in the program storage area of the memory 56, various programs Pa included in the information processing program are stored.

The operation data Da is data set in accordance with a user operation on the information processing apparatus 5 and is data representing the content of the operation performed on the operation section 51.

The event right data Db is data representing the right to participate in an event held at a particular place and the content of the holding of the event.

The event setting data Dc is data for, when an event is held at a particular place, setting the content of the event. If the information processing apparatus 5 is located at the particular place, the information processing apparatus 5 acquires the event setting data Dc from the server 200.

The event result data Dd is data representing the result of an event and is stored when the event has ended.

The use prohibition flag data De is data representing a use prohibition flag indicating whether or not the event right data Db can be used. If the use of the event right data Db is prohibited, the use prohibition flag data De is set to on.

The event image data Df is data for generating various images when an event is held and displaying the generated various images on the LCD 52.

Figure 7:
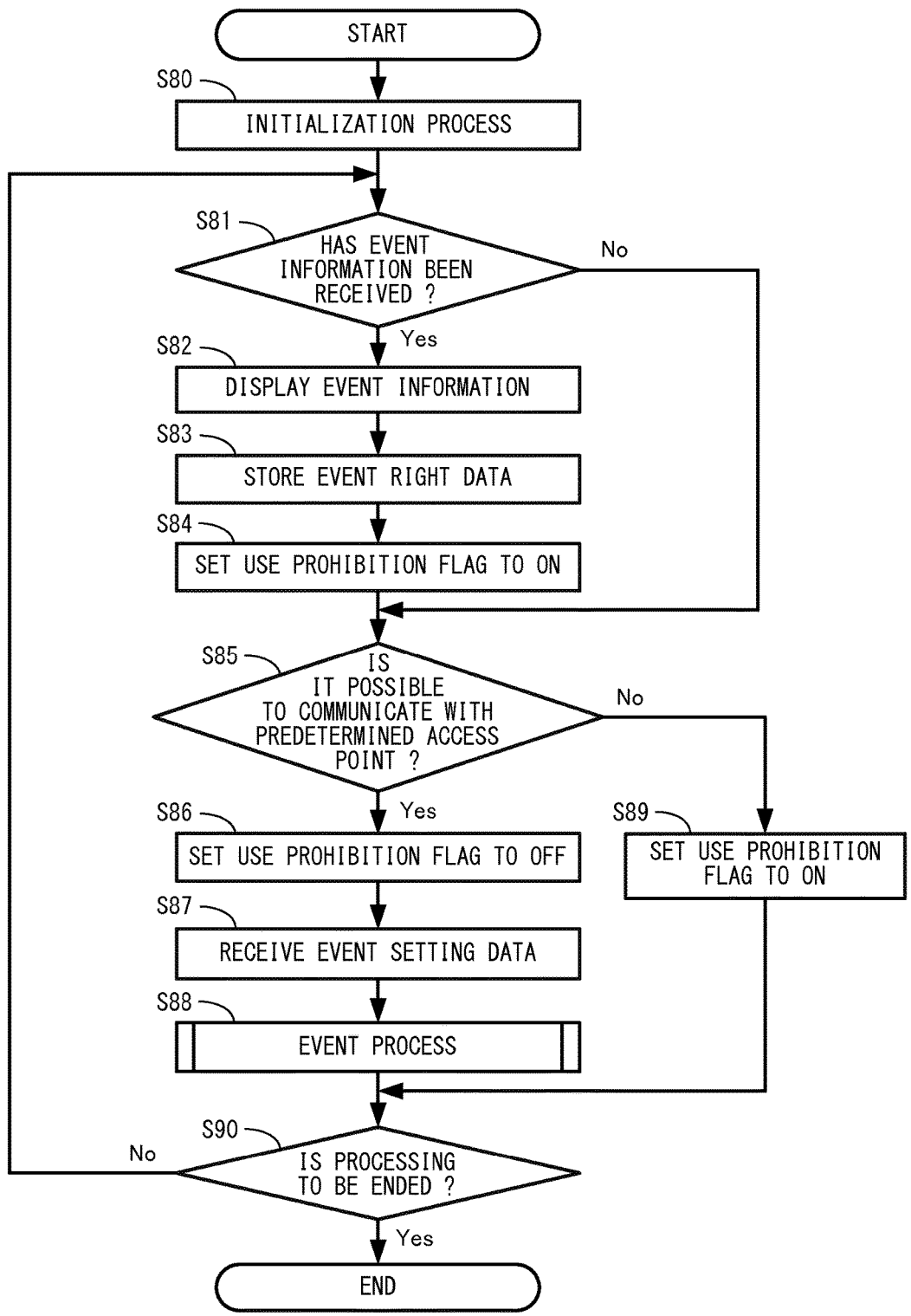
FIG. 7 is a flow chart showing a non-limiting example of information processing performed by the information processing apparatus 5 (a CPU 55)

Next, with reference to FIGS. 7 and 8, the details of the processing performed by the information processing apparatus 5 are described. It should be noted that FIG. 7 is a flow chart showing an example of information processing performed by the information processing apparatus 5 (the CPU 55). FIG. 8 is a subroutine flow chart showing an example of the detailed processing of an event process in step 88 in FIG. 7. Here, in the flow charts shown in FIGS. 7 and 8, a description is given mainly of, in the processing performed by the information processing apparatus 5 included in the above information processing system 1, the process where event information is received and the event is held. Detailed descriptions of other processes not directly related to these processes are omitted. In the exemplary embodiment, a series of processes shown in FIGS. 7 and 8 are performed by the CPU 55 executing the information processing program stored in the program storage section 57.

It should be noted that the information processing shown in FIGS. 7 and 8 is started at any timing. For example, in accordance with the fact that the user has given an instruction to start the information processing, the execution of the information processing program may be started. At this time, a part or all of the information processing program is loaded into the memory 56 at appropriate timing and executed by the CPU 55. Consequently, the series of processes shown in FIGS. 7 and 8 is started. It should be noted that the information processing program is stored in advance in the program storage section 57 included in the information processing apparatus 5. Alternatively, in another exemplary embodiment, the information processing program may be acquired from a storage medium attachable to and detachable from the information processing apparatus 5 and stored in the memory 56, or may be acquired from another apparatus via a network such as the Internet and stored in the memory 56.

In addition, the processes of all the steps in the flow charts shown in FIGS. 7 and 8 are merely illustrative. Thus, the processing order of the steps may be changed, or another process may be performed in addition to and/or instead of the processes of all the steps, so long as similar results are obtained. Further, in the exemplary embodiment, the CPU 55 may perform the processes of some of the steps in the flow charts, and a processor or a dedicated circuit other than the CPU 55 may perform the processes of the other steps.

Yet alternatively, a processor or a dedicated circuit other than the CPU 55 may perform the processes of all the steps in the flow charts.

Referring to FIG. 7, the CPU 55 performs an initialization process in the information processing (step 80), and the processing proceeds to the next step. For example, in the above step 80, the CPU 55 initializes parameters used in the information processing.

Next, the CPU 55 determines whether or not event information has been received from another apparatus (step 81). Then, if event information has been received, the processing proceeds to step 82. If, on the other hand, event information has not been received, the processing proceeds to step 85. For example, if event right data indicating the content of the holding of an event and the right to participate in the event has been received from another apparatus, the CPU 55 determines that event information has been received. As an example, the event right data is transmitted from another apparatus by direct communication (e.g., near field communication) or by wireless communication via a predetermined access point. It should be noted that the event right data may be stored in advance in the memory 56. In this case, when the right to participate in the event indicated by the event right data has been validated, the determination is affirmative in the above step 81.

In step 82, the CPU 55 performs the process of displaying on the LCD 52 the event information corresponding to the received data, and the processing proceeds to the next step. For example, based on the content of the holding of the event indicated by the event right data received from the other apparatus, the CPU 55 performs the process of displaying, on the LCD 52, information about the holding of the event in which the right to participate has been obtained (e.g., the lottery ticket shown in FIG. 2 or 3, the written challenge shown in FIG. 4, the power spot information shown in FIG. 5, or the like).

Next, the CPU 55 stores the acquired event right data (step 83), and the processing proceeds to the next step. For example, the CPU 55 stores the event right data acquired from the other apparatus, as the event right data Db in the memory 56.

Next, the CPU 55 sets the use prohibition flag to on (step 84), and the processing proceeds to step 85. For example, the CPU 55 sets the use prohibition flag indicated by the use prohibition flag data De to on, thereby updating the use prohibition flag data De. It should be noted that a use prohibition flag may be set for each piece of acquired event right data. In this case, in the above step 84, the CPU 55 sets the use prohibition flag corresponding to the event right data stored in the above step 83 to on.

In step 85, the CPU 55 determines whether or not the information processing apparatus 5 can communicate with a predetermined access point (e.g., the access point AP in the examples of FIGS. 2 to 5). For example, the CPU 55 searches for an access point by so-called passive scan or active scan, using an identifier for connecting to an access point. Next, if the predetermined access point has been detected and a connection with the access point has been established, the CPU 55 sets an apparatus (e.g., the server 200) set as a communication partner to and from which data is transmitted and received via the access point. Then, the CPU 55 starts communication. Then, the processing proceeds to step 86. On the other hand, if the predetermined access point has not been detected, or if a connection with the predetermined access point cannot be established, the processing proceeds to step 89.

In step 86, the CPU 55 sets the use prohibition flag to off, and the processing proceeds to the next step. For example, the CPU 55 sets the use prohibition flag indicated by the use prohibition flag data De to off, thereby updating the use prohibition flag data De. It should be noted that if a use prohibition flag is set for each piece of acquired event right data, then in the above step 86, the use prohibition flag corresponding to event right data that is enabled to be used when the information processing apparatus 5 has become able to communicate with the predetermined access point is set to off.

Next, the CPU 55 receives event setting data transmitted from the set apparatus that is the communication partner (step 87), and the processing proceeds to the next step. For example, based on information about the event managed by the server 200, the server 200 is transmitting, to the information processing apparatus 5 having established the connection with the particular access point AP, event setting data indicating the content of the event (e.g., the probability of winning a lottery, information about a character to be caused to appear, information about the numerical value of a parameter to be changed, or the like). In the above step 87, the CPU 55 receives event setting data transmitted from the server 200 and stores the received event setting data as the event setting data Dc in the memory 56.

Next, the CPU 55 performs an event process (step 88), and the processing proceeds to step 90. The detailed content of the event process performed in the above step 88 will be described with reference to FIG. 8.

In FIG. 8, the CPU 55 determines whether or not the information processing apparatus 5 owns the event right data related to the access point AP with which the connection is established (step 91). Then, if the information processing apparatus 5 owns the event right data related to the access point AP with which the connection is established, the processing proceeds to step 92. If, on the other hand, the information processing apparatus 5 does not own the event right data related to the access point AP with which the connection is established, the processing of this subroutine ends. For example, if, with reference to the event right data Db, the event right data indicating the right to participate in the event to be held using the access point AP with which the connection is established at the current moment is stored, the determination is affirmative in the above step 91.

In step 92, the CPU 55 acquires operation data indicating the content of the operation performed on the operation section 51, and the processing proceeds to the next step. For example, the CPU 55 stores operation data newly acquired from the operation section 51, as the operation data Da3 in the memory 56.

Next, the CPU 55 determines whether or not the event set in the event setting data Dc is to be held (step 93). Then, if the event is to be held, the processing proceeds to step 94. If, on the other hand, the event is not to be held, the processing of the subroutine ends. For example, if the operation data acquired in the above step 92 indicates the operation of starting the event or if the event is already being held, the determination is affirmative in the above step 93. If, on the other hand, the operation of starting the event has not yet been performed, the determination is negative in the above step 93.

In step 94, the CPU 55 performs the event process using the event right data, and the processing proceeds to the next step. For example, based on the event right data related to the access point AP with which the connection is established, the CPU 55 performs an event representation process. For example, if the event right data regarding the above first event is used, the CPU 55 advances a lottery event indicated by the event right data based on the operation data Da, the event setting data Dc, and the like. If the event right data regarding the above second event is used, the CPU 55 changes, based on the event setting data Dc, a parameter (the winning probability) when a lottery event is held, and advances the lottery event indicated by the event right data, based on the operation data Da and the like. If the event right data regarding the above third event is used, the CPU 55 causes a character indicated by the event right data to appear in a versus game and advances the versus game based on the operation data Da and the like. Further, if the event right data regarding the above fourth event is used, the CPU 55 changes, based on the event right data Db and the event setting data Dc, a parameter (the offensive strength) used when a versus game is performed, and advances the versus game based on the operation data Da and the like.

Next, the CPU 55 performs the process of displaying on the LCD 52 an image corresponding to the progress of the event processed in the above step 94 (step 95), and the processing proceeds to the next step.

Next, the CPU 55 determines whether or not the event is to be ended (step 96). Examples of conditions for ending the event include: the fact that the event has advanced to an ending scene (e.g., a scene that informs the user of the result of the lottery or a scene where the versus game ends); and the fact that the user has performed the operation of ending the event. Then, if the event is to be ended, the processing proceeds to step 97. If, on the other hand, the event is to be continued, the processing of the subroutine ends.

In step 97, the CPU 55 transmits event result data indicating the result of the event to the server 200, and the processing proceeds to the next step. For example, the server 200 receives event result data transmitted from the information processing apparatus 5 and manages various events to be held in the information processing apparatus 5 via the particular access point AP.

Next, the CPU 55 stores the event result data indicating the result of the event (step 98), and the processing proceeds to the next step. For example, the CPU 55 stores, as the event result data Dd in the memory 56, the event result data indicating the result of the event of which the ending has been determined in the above step 96.

Next, the CPU 55 erases the event right data (step 99), and the processing of the subroutine ends. For example, the CPU 55 erases from the memory 56 the event right data indicating the right to participate in the event of which the ending has been determined in the above step 96.

Referring back to FIG. 7, if the information processing apparatus 5 cannot communicate with the predetermined access point in the above step 85, the CPU 55 sets the use prohibition flag to on (step 89), and the processing proceeds to step 90. By the processes of steps 84 and step 89, if the information processing apparatus 5 cannot communicate with the predetermined access point, the use of the data (the event right data) stored in advance in the above step 83 is prohibited. It should be noted that the timing for changing the use prohibition flag to on in the above step 89 may be another timing, such as after a predetermined time has elapsed since the wireless communication with the particular access point has changed from a connected state to an unconnected state, or after a predetermined time has elapsed since the wireless communication with the particular access point has changed from an unconnected state to a connected state. Further, in the above processing, an example has been used where the prohibition or permission of the use of the data is managed using use prohibition flag data. Alternatively, the prohibition or permission of the use of the data may be managed using another method.

In step 90, the CPU 55 determines whether or not the processing is to be ended. Examples of conditions for ending the processing include the fact that the user has performed the operation of ending the processing. If the processing is not to be ended, the CPU 55 returns to the above step 81 and repeats the process thereof. If the processing is to be ended, the CPU 55 ends the processing indicated by the flow chart. Thereafter, the CPU 55 repeatedly performs a series of processes of steps 81 to 89 until it is determined in step 90 that the processing is to be ended.

It should be noted that the information processing system 1 described above uses a form in which the content of an event to be held by the information processing apparatus 5 is controlled by the server 200, which manages the event. Alternatively, the above various events may be held without transmitting and receiving data to and from the server 200. In this case, the information processing apparatus 5 may control the content of an event only using event right data received from another apparatus.

In addition, the above descriptions are given of the processing procedure used when a single information processing apparatus 5 performs information processing. Alternatively, another apparatus may perform at least some of the processing steps in the information processing. For example, if the information processing apparatus 5 is further configured to communicate with another apparatus (e.g., another server, another game apparatus, or another mobile terminal), the other apparatus may cooperate to perform the processing steps of the information processing. Another apparatus may thus perform at least some of the processing steps in the information processing, thereby enabling processing similar to the above information processing. Further, the above information processing can be performed by a processor or the cooperation of a plurality of processors, the processor or the plurality of processors included in an information processing system including at least one information processing apparatus. Further, in the above exemplary embodiment, the processing indicated in the above flow charts is performed by the CPU 55 of the information processing apparatus 5 executing a predetermined program. Alternatively, a part or all of the processing indicated in the flow charts may be performed by a dedicated circuit included in the information processing apparatus 5.

Here, the above variations make it possible to achieve the exemplary embodiment also by a system form such as so-called cloud computing, or a system form such as a distributed wide area network or a local area network. For example, in a system form such as a distributed local area network, it is possible to execute the processing between a stationary information processing apparatus (a stationary game apparatus) and a handheld information processing apparatus (a handheld game apparatus) by the cooperation of the apparatuses. It should be noted that, in these system forms, there is no particular limitation on which apparatus performs the process of each step of the above processing. Thus, it goes without saying that it is possible to achieve the exemplary embodiment by sharing the processing in any manner.

In addition, the processing orders, the setting values, the conditions used in the determinations, and the like that are used in the above information processing are merely illustrative. Thus, it goes without saying that the exemplary embodiment can be achieved also with other orders, other values, and other conditions.

In addition, each of the above programs may be supplied to the information processing apparatus 5 not only through an external storage medium such as the external memory, but also through a wired or wireless communication link. Further, the program may be stored in advance in a non-volatile storage device included in the information processing apparatus 5. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the above various functions by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the present exemplary embodiment is useful as, for example, an information processing apparatus, an information processing system, an information processing program, an information processing method, and the like in order, for example, to enhance the interest of a user about a particular place.

What is claimed is:

1. An information processing apparatus capable of communicating with another apparatus, the information processing apparatus comprising memory and one or more processors configured to:

store, in the memory, data associated with a particular real world place, wherein the stored data is stored in the memory when the information processing apparatus is located at a place different from the particular real world place;

based on the stored data, display, on a display, information relating to the particular real world place;

after displaying the information, determine whether or not the information processing apparatus is located at the particular real world place;

in response to determining that the information processing apparatus is located at the particular real world place, permit use of the stored data to perform a user interactive event based on the stored data; and in response to the information processing apparatus satisfying, during the user interactive event, a predetermined condition related to the fact that the information processing apparatus is located at the particular real world place, or in response to determining that the information processing apparatus has moved away from the particular real world place, prohibit the permitted use of the stored data.

2. The information processing apparatus according to claim 1, wherein the one or more processors are further configured to determine whether or not a predetermined time has elapsed since it has been determined in the determination of the location that the information processing apparatus has been located at the particular real world place, and if it is determined in the determination of the predetermined time that the predetermined time has elapsed, prohibit the permitted use of the stored data.

3. The information processing apparatus according to claim 1, wherein the one or more processors are further configured to determine whether or not a predetermined time has elapsed since it has been determined in the determination of the location that the information processing apparatus has not been located at the particular real world place after it had been determined that the information processing apparatus had been located at the particular real world place, and if it is determined in the determination of the predetermined time that the predetermined time has elapsed, prohibit the permitted use of the stored data.

4. The information processing apparatus according to claim 1, wherein the user interactive event includes participation of other information processing apparatuses simultaneously located at the particular real world place.

5. The information processing apparatus according to claim 1, wherein the one or more processors are further configured to, when the information processing apparatus is located at a place different from the particular real world place, receive data transmitted from another apparatus and store the received data in the memory, and after it has been determined in the determination of the location that the information processing apparatus has been located at the particular real world place, the use of the stored data received at the place different from the particular real world place is permitted.

6. The information processing apparatus according to claim 1, wherein the one or more processors are further configured to receive data transmitted from another apparatus located at the particular real world place and store the received data in the memory, and if it is determined in the determination of the location that the information processing apparatus is located at the particular real world place, the use of the data received at the particular real world place from the another apparatus and stored in the memory is permitted.

7. The information processing apparatus according to claim 1, wherein the memory includes additional multi-user related data and the one or more processors are further configured to determine whether or not another information processing apparatus is located at the particular real world place, and use of the multi-user related data is permitted in accordance with whether another information processing apparatus is located at the particular real world place.

8. The information processing apparatus according to claim 1, wherein if the information processing apparatus can communicate data via a particular access point installed at the particular real world place, it is determined that the information processing apparatus is located at the particular real world place.

9. The information processing apparatus according to claim 1, wherein the stored data is winning probability data.

10. The information processing apparatus according to claim 1, wherein the stored data is game character data.

11. The information processing apparatus according to claim 1, wherein the one or more processors are further configured to delete the stored data from the memory in response to determining that the information processing apparatus has moved away from the particular real world place.

12. The information processing apparatus according to claim 1, wherein the stored data includes a plurality of event right data, each event right data associated with a different real world place and each event right data giving the right to participate in a different user interactive event.

13. The information processing apparatus according to claim 1, wherein the predetermined condition is that a predetermined time has elapsed since it has been determined that the information processing apparatus has been located at the particular real world place.

14. The information processing apparatus according to claim 1, wherein information relating to the particular real world place is displayed upon satisfying an interactive condition in the user interactive event.

15. An information processing apparatus capable of communicating with another apparatus, the information processing apparatus comprising memory and one or more processors configured to:

store, in the memory, data associated with a particular real world place, wherein the stored data is stored in the memory when the information processing apparatus is located at a place different from the particular real world place;

based on the stored data, display, on a display, information relating to the particular real world place;

after displaying the information, determine whether or not the information processing apparatus is located at the particular real world place;

in response to determining that the information processing apparatus is located at the particular real world place, change a parameter used when predetermined processing providing a user interactive event is performed; and in response to determining that the information processing apparatus has moved away from the particular real world place, change back the changed parameter to an original state.

16. The information processing apparatus of claim 15, wherein changing the parameter in response to determining that the information processing apparatus is located at the particular real world place includes (1) changing the parameter to a first value upon determining that no other information processing apparatuses have established a connection with an access point installed at the particular real world place while the information processing apparatus has an established connection with the access point, and (2) changing the parameter to a second value upon determining that one or more other information processing apparatuses have established a connection with the access point installed at the particular real world place while the information processing apparatus has an established connection with the access point.

17. An information processing system including a plurality of apparatuses capable of communicating with each other, the plurality of apparatuses including at least one information processing apparatus, the information processing system comprising one or more processors configured to:

store, in memory of the information processing apparatus, data associated with a particular real world place, wherein the stored data is stored in the memory when the information processing apparatus is located at a place different from the particular real world place;

based on the stored data, display, on a display, information relating to the particular real world place;

after displaying the information, determine whether or not the information processing apparatus is located at the particular real world place;

in response to determining that the information processing apparatus is located at the particular real world place, permit use of the stored data to perform a user interactive event based on the stored data; and in response to the information processing apparatus satisfying, during the user interactive event, a predetermined condition related to the fact that the information processing apparatus is located at the particular real world place, or in response to determining that the information processing apparatus has moved away from the particular real world place, prohibit the permitted use of the stored data.

18. The information processing system according to claim 17, wherein the stored data is winning probability data.

19. The information processing system according to claim 17, wherein the stored data is game character data.

20. An information processing system including a plurality of apparatuses capable of communicating with each other, the plurality of apparatuses including at least one information processing apparatus, the information processing system comprising one or more processors configured to:

store, in memory of the information processing apparatus, data associated with a particular real world place, wherein the stored data is stored in the memory when the information processing apparatus is located at a place different from the particular real world place;

based on the stored data, display, on a display, information relating to the particular real world place associated with the stored data;

after displaying the information, determine whether or not the information processing apparatus is located at the particular real world place;

in response to determining that the information processing apparatus is located at the particular real world place, change a parameter used when predetermined processing providing a user interactive event is performed; and in response to determining that the information processing apparatus has moved away from the particular real world place, change back the changed parameter to an original state.

21. A non-transitory computer-readable storage medium having stored therein an information processing program executed by a computer included in an information processing apparatus capable of communicating with another apparatus, the information processing program causing the computer to execute:

storing, in memory of the information processing apparatus, data associated with a particular real world place, wherein the stored data is stored in the memory when the information processing apparatus is located at a place different from the particular real world place;

based on the stored data, displaying, on a display, information relating to the particular real world place;

after displaying the information, determining whether or not the information processing apparatus is located at the particular real world place;

in response to determining that the information processing apparatus is located at the particular real world place, permitting use of the stored data to perform a user interactive event based on the stored data; and in response to the information processing apparatus satisfying, during the user interactive event, a predetermined condition related to the fact that the information processing apparatus is located at the particular real world place, or in response to determining that the information processing apparatus has moved away from the particular real world place, prohibiting the permitted use of the stored data.

22. The non-transitory computer-readable storage medium according to claim 21, wherein the stored data is winning probability data.

23. The non-transitory computer-readable storage medium according to claim 21, wherein the stored data is game character data.

24. A non-transitory computer-readable storage medium having stored therein an information processing program executed by a computer included in an information processing apparatus capable of communicating with another apparatus, the information processing program causing the computer to execute:

storing, in memory of the information processing apparatus, data associated with a particular real world place, wherein the stored data is stored in the memory when the information processing apparatus is located at a place different from the particular real world place;

based on the stored data, displaying, on a display, information relating to the particular real world place;

after displaying the information, determining whether or not the information processing apparatus is located at the particular real world place;

in response to determining that the information processing apparatus is located at the particular real world place, changing a parameter used when predetermined processing providing a user interactive event is performed; and in response to determining that the information processing apparatus has moved away from the particular real world place, changing back the changed parameter to an original state.

25. An information processing method performed by a processor or cooperation of a plurality of processors, the processor or the plurality of processors included in a system including at least one information processing apparatus capable of communicating with another apparatus, the information processing method comprising:

storing, in memory of the information processing apparatus, data associated with a particular real world place, wherein the stored data is stored in the memory when the information processing apparatus is located at a place different from the particular real world place;

based on the stored data, displaying, on a display associated with the information processing apparatus, information relating to the particular real world place;

after displaying the information, determining whether or not the information processing apparatus is located at the particular real world place;

in response to determining that the information processing apparatus is located at the particular real world place, permitting use of the stored data to perform a user interactive event based on the stored data;

in response to the information processing apparatus satisfying, during the user interactive event, a predetermined condition related to the fact that the information processing apparatus is located at the particular real world place or in response to determining that the information processing apparatus has moved away from the particular real world place, prohibiting the permitted use of the stored data.

26. The information processing method according to claim 25, wherein the stored data is winning probability data.

27. The information processing method according to claim 25, wherein the stored data is game character data.

28. An information processing method performed by a processor or cooperation of a plurality of processors, the processor or the plurality of processors included in a system including at least one information processing apparatus capable of communicating with another apparatus, the information processing method comprising:

storing, in memory of the information processing apparatus, data associated with a particular real world place, wherein the stored data is stored in the memory when the information processing apparatus is located at a place different from the particular real world place;

based on the stored data, displaying, on a display, information relating to the particular real world place;

after displaying the information, determining whether or not the information processing apparatus is located at the particular real world place;

in response to determining that the information processing apparatus is located at the particular real world place, changing a parameter used when predetermined processing providing a user interactive event is performed; and in response to determining that the information processing apparatus has moved away from the particular real world place, changing back the changed parameter to an original state.

29. An information processing apparatus capable of communicating with another apparatus, the information processing apparatus comprising memory storing data including single-user application data and multi-user application data, and one or more processors configured to:

display, on a display, information relating to a particular real world place associated with the stored data;

after displaying the information, determine whether or not the information processing apparatus is located at the particular real world place;

in response to determining that the information processing apparatus is located at the particular real world place and that no other information processing apparatuses have established a connection with an access point installed at the particular real world place, permit use of the stored single-user application data to perform a user interactive event based on the stored single-user application data;

in response to determining that the information processing apparatus is located at the particular real world place and that one or more other information processing apparatus have established a connection with the access point installed at the particular real world place, permit use of the multi-user application data to perform the user interactive event based on the stored multi-user application data; and in response to the information processing apparatus satisfying, during the user interactive event, a predetermined condition related to the fact that the information processing apparatus is located at the particular real world place, or in response to determining that the information processing apparatus has moved away from the particular real world place, prohibit the permitted use of the stored data.

* * * * *